(12) United States Patent
Simon (10) Patent No.: US 11,597,604 B1
(45) Date of Patent: Mar. 7, 2023

(54) CONVEYOR SAFELY GUARD MODULES (71) Applicant: Jakob Simon, Callahan, FL (US)

(72) Inventor: Jakob Simon, Callahan, FL (US)

( * ) Notice: Subject to any disclaimer, the term of this patent is extended or adjusted under 35 U.S.C. 154(b) by 0 days.

(21) Appl. No.: 17/684,725

(22) Filed: Mar. 2, 2022

(51) Int. Cl.
*B65G 13/02* (2006.01)
*B65G 39/20* (2006.01)

(52) U.S. Cl.
CPC ............ *B65G 39/20* (2013.01); *B65G 13/02* (2013.01); *B65G 2207/40* (2013.01)

(58) Field of Classification Search
CPC ..... B65G 13/02; B65G 39/20; B65G 2207/40
USPC ................................ 198/781.03, 845, 860.3
See application file for complete search history.

(56) References Cited

U.S. PATENT DOCUMENTS

| | | | | |
|---|---|---|---|---|
| 4,325,474 A * | 4/1982 | Rae | ...................... | B65G 47/261 198/781.04 |
| 4,396,112 A * | 8/1983 | von Wietersheim | .. | B65G 21/00 198/814 |
| 5,038,925 A * | 8/1991 | Chrysler | ................ | B65G 15/02 198/845 |
| 5,311,982 A * | 5/1994 | Clopton | ................ | B65G 17/38 198/779 |
| 6,318,545 B1 * | 11/2001 | Ross, II | ................ | B65G 15/00 198/860.3 |
| 6,619,473 B2 * | 9/2003 | Romeo | ................ | B65G 21/14 198/861.2 |
| 7,035,714 B2 * | 4/2006 | Anderson | .............. | B65G 43/08 198/577 |
| 7,882,944 B1 * | 2/2011 | Eubanks | ................ | B65G 13/07 198/860.3 |
| 8,396,587 B2 * | 3/2013 | Saitou | ................ | G05B 19/4189 713/400 |
| 8,950,611 B2 * | 2/2015 | Derrien | ................ | B65D 1/0276 215/373 |
| 10,968,043 B1 * | 4/2021 | Alsup | ................... | B65G 17/40 |
| 10,988,314 B2 | 4/2021 | Guerra et al. | | |

* cited by examiner

*Primary Examiner* — Douglas A Hess (57) ABSTRACT

Conveyor safety guard modules that are configured to be inserted between adjacent rollers in motor driven roller conveyor systems and shield drive bands or belts coupled between the adjacent rollers so as to protect workers from having their work gloves, loose hair, loose clothing, etc. becoming entangled in the drive bands or belts and causing injury.

20 Claims, 10 Drawing Sheets

CONVEYOR SAFELY GUARD MODULES

BACKGROUND

The present invention relates generally to conveyor systems and more particularly to conveyor safety guard modules for motorized roller conveyor systems which conveyor safety guard modules protect workers from being injured by the drive mechanisms of the conveyor systems.

Conveyor systems are used for a variety of purposes. Exemplary conveyor systems include packaging systems, order fulfillment systems, manufacturing systems, shipping sortation systems, and returns processing systems. Some conveyor systems use centralized multi-horsepower AC motors to drive shafts, belts or chains that, in turn, rotate banks of rollers to transport items throughout the conveyor system. Other conveyor systems include rollers with internal DC "micro-horsepower" motors that rotate a localized segment of rollers. The latter systems include brushless DC roller conveyor systems.

A brushless DC roller conveyor system includes several components and features, such as drive rollers with self-contained brushless DC motors, intelligent local controllers, and networking between the controllers based on bidirectional communication protocols.

In motorized roller conveyor systems a length of a conveyor system is made up of sections that include a single motor driven roller. As the motor driven roller is rotated, drive bands or belts coupled to the ends of adjacent rollers, including the motor driven roller, transfer rotational movement to each of the rollers in each section. FIG. 2 of U.S. Pat. No. 6,370,447 provides an example of the use of "mounting belts 10b" that transfer rotational force of a motorized roller 10 to the free rollers 10a.

The use of drive bands or belts coupled to the ends of adjacent rollers for purposes of transferring rotational movement from motor driven rollers to free rollers presents a safety hazard to personnel whose jobs require working next to such conveyor systems and placing or removing or orienting packages and other articles on the conveyor sections. Specifically, such workers' gloves, loose hair, clothing, etc. can become caught and entangled and pulled by the drive bands or belts, causing injury to the workers.

U.S. Pat. No. 10,988,314 to Guerra et al. teaches the need of a guide edge in conveyor systems that have angled roller configurations designed to move conveyed articles to one side of the conveyor system. In FIG. 4 a guard that functions as a guide edge can be bolted along one side of a conveyor.

The present invention provides conveyor safety guard modules for use with motor driven conveyor systems that can be retrofitted onto existing motor driven conveyor systems and used to protect workers from injuries from otherwise exposed drive bands or belts that transfer rotational movement from motor driven rollers to free rollers.

BRIEF SUMMARY

According to various features, characteristics and embodiments of the present invention which will become apparent as the description thereof proceeds, the present invention provides an improvement to a conveyor system having a plurality of rollers including at least one motor driven roller and free rollers and drive bands or belts coupled between the plurality of rollers to transfer rotational movement between the rollers, the improvement comprising at least one conveyor safety guard module configured to be inserted between adjacent pairs of the rollers, wherein each of the at least one conveyor safety guard module comprises:

a top cover portion; and resilient engaging structures that extend downward from the top cover portion, wherein each resilient engaging structure includes a pair of resilient arcuate legs that are configured to be received between two adjacent rollers of the motor driven roller conveyor and position the top cover portion over the drive bands or belts.

The present invention further provides in improvement to a conveyor system having a plurality of rollers including at least one motor driven roller and free rollers and drive bands or belts coupled between the plurality of rollers to transfer rotational movement between the rollers, the improvement comprising at least one conveyor safety guard module configured to be inserted between adjacent pairs of the rollers, wherein each of the at least one conveyor safety guard module comprises:

a top cover portion having opposite sides and front and rear surfaces;

a channel provided in the top surface of the cover portion that extends between the front and rear surfaces of the top cover portion; and at least one resilient engaging structure that extend downward from at least one of the opposite sides of the top cover portion, wherein each resilient engaging structure includes a pair of resilient arcuate legs that are configured to be received between two adjacent rollers of the motor driven roller conveyor and position the top cover portion under the drive bands or belts so that the drive bands or belts pass through the channel provided in the top surface of the cover portion.

The present invention further provides a method of modifying a motor driven roller conveyor system to make the system safe for workers which method comprises:

providing a conveyor system having a plurality of rollers including at least one motor driven roller and free rollers and drive bands or belts coupled between the plurality of rollers to transfer rotational movement between the rollers;

providing at least one conveyor safety guard module configured to be inserted between adjacent pairs of the rollers and shield workers from drive bands or belts coupled to the adjacent rollers; and inserting said at least one conveyor safety guard module between an adjacent pair of the rollers and shielding drive bands or belts coupled to the adjacent rollers with a top portion of the at least one conveyor safety guard module.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

The conveyor safety guard modules of the present invention are designed and configured to pushed downward into position between adjacent rollers in a motor driven roller conveyor system and cover drive bands or belts that are provided along one side of the rollers.

The conveyor safety guard modules of the present invention include a top cover portion and lower extending resilient engaging structures that are designed and configured to resiliently engage between lower portions of the sides of two adjacent rollers to secure the conveyor safety guard modules in place with the cover portion covering drive bands or belts that are coupled to the ends of the adjacent rollers and thereby guard against a worker's gloves, any article of clothing, lose hair, etc. from becoming entangled in the drive bands or belts.

The top cover portion can flat so as not to present any protruding features that might get in the way and hinder a worker placing or removing or orienting packages and other articles on conveyor sections. In addition the top cover portion can be provided with orange and white caution markings or similar indicia to provide a safety warning.

The lower extending resilient engaging structures include resilient arcuate legs that extend downwardly from lower sidewalls that in turn extend downward from opposite sides of the top cover portion. The arcuate shape of the resilient legs extends and continues along the forward and rearward sides of the lower sidewalls. Herein reference to forward and rearward is intended to refer to the longitudinal direction of a conveyor system and the direction in which articles are conveyed along a conveyor system.

The tips or end portions of the resilient arcuate legs comprise a reverse curved or slanted shape that will engage facing surfaces of adjacent rollers causing the ends of the resilient legs to deflect towards one another and allow the conveyor safety guard modules to be received and seated downward between adjacent rollers with the arcuate shape of the resilient arcuate legs resting against the adjacent roller surfaces and the top cover portion extending relatively flat over tops of the adjacent rollers where the drive bands or belts are provided. Friction between the resilient legs of the conveyor safety guard modules and the rotating surfaces of the adjacent rollers can be minimized by configuring the resilient legs so that they only contact the adjacent rollers with a minimum about of pressure to maintain the position of the conveyor safety guard modules between the adjacent rollers without applying pressure that would create excessive friction and drag on the rotation of the rollers. The conveyor safety guard modules could loosely fit in position between adjacent rollers and function as desired as long as the top cover portion remains in position to shield a worker from the drive bands or belts.

The conveyor safety guard modules of the present invention can be molded from a material presenting a surface with good abrasion resistance and a low coefficient of friction such as ultra-high-molecular-weight (UHMW) polyethylene, high-density polyethylene, nylon, or the like.

Throughout the description of FIGS. 2-22 which follows the same reference numbers are used to identify the same elements where possible to simplify the description of the various embodiments of the conveyor safety guard modules of the present invention.

Figure 1:
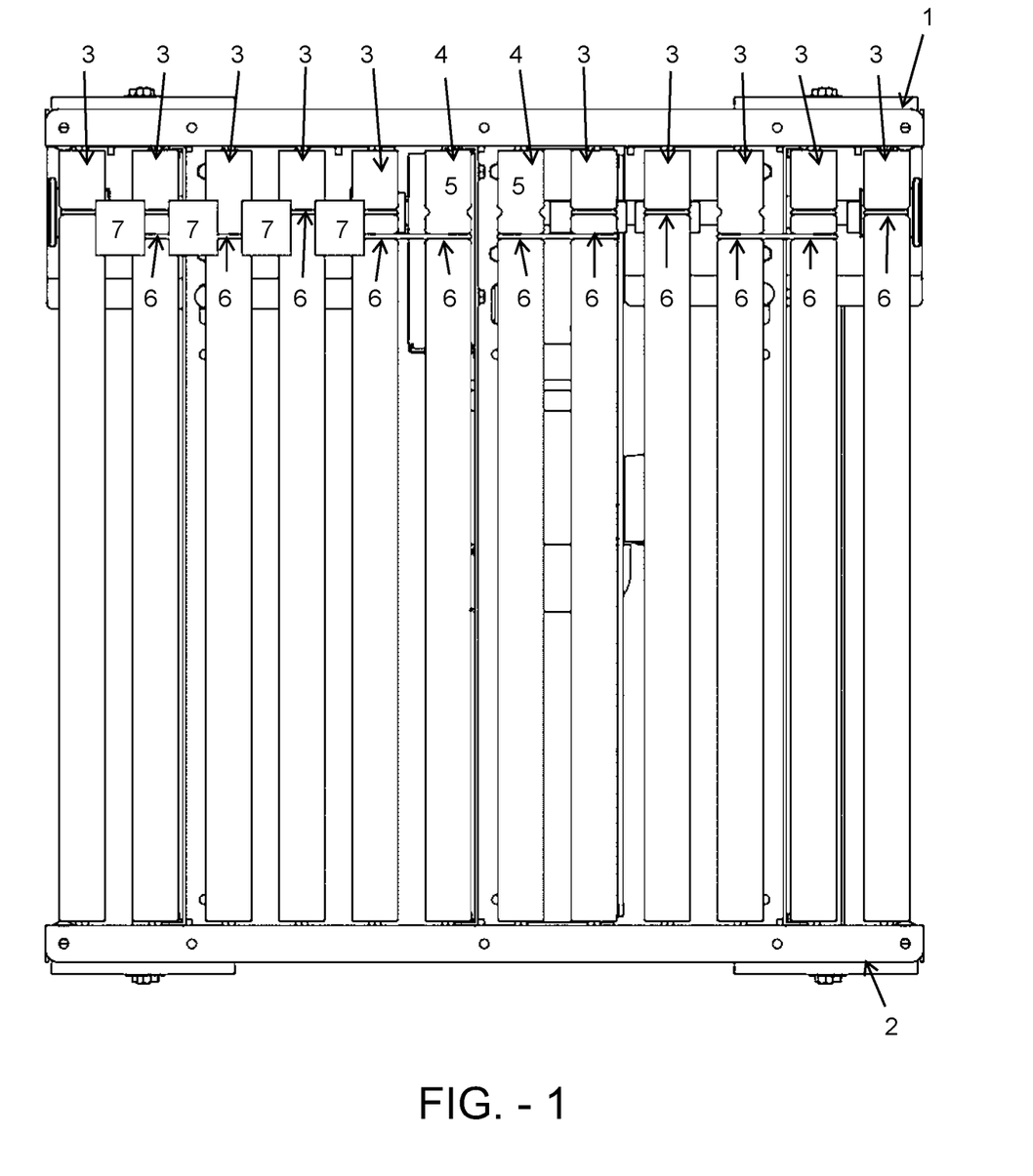
FIG. 1 is top view of a segment of a motor driven conveyor system.

FIG. 1 is top view of a segment of a motor driven conveyor system. The motor driven conveyor of FIG. 1 includes side rails 1 and 2 between which are mounted a plurality of free rollers 3 and at least one motor driven roller 4. At one end of each of the free rollers 3 and motor driven roller 4 are a pair grooved channels 5 that are aligned so that drive bands or belts 6, including O-ring bands can be arranged in the grooved channels 5 between adjacent rollers as shown to transfer rotational movement to each of the rollers in each section.

The conveyor safety guard modules 7 according to the present invention can be provided over a series of adjacent rollers (free and drive) as shown in FIG. 1 to provide a work station that is safe for a worker to operate within. The conveyor safety guard modules 7 cover the drive bands or belts as discussed herein to prevent a worker's gloves, loose hair, clothing, etc. can become caught and entangled and pulled by the drive bands or belts, causing injury to the workers.

As discussed below, the conveyor safety guard modules can be inserted between adjacent rollers (including motor driven and free rollers) from above the rollers and be removed as desired for removal and replacement. According to some embodiments the conveyor safety guard modules can be removed manually by hand and in other embodiments the conveyor safety guard modules can be removed with a pry tool.

Figure 2:
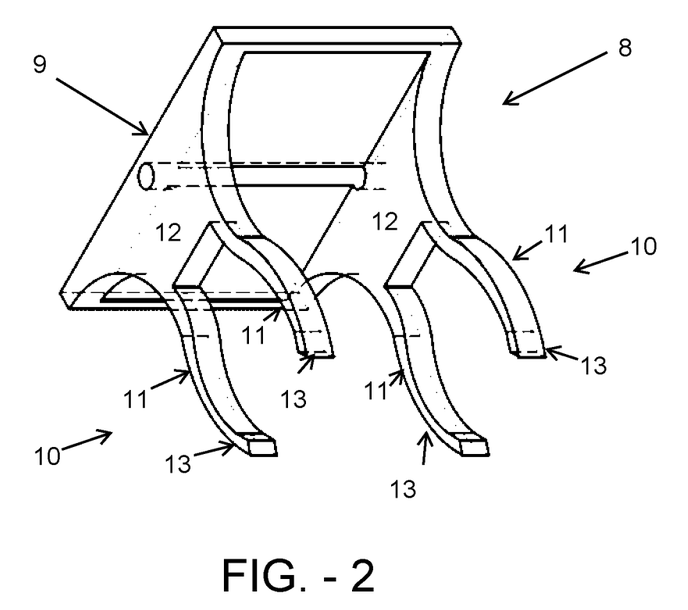
FIG. 2 is a perspective view of a conveyor safety guard module according to one embodiment of the present invention.
Figure 3:
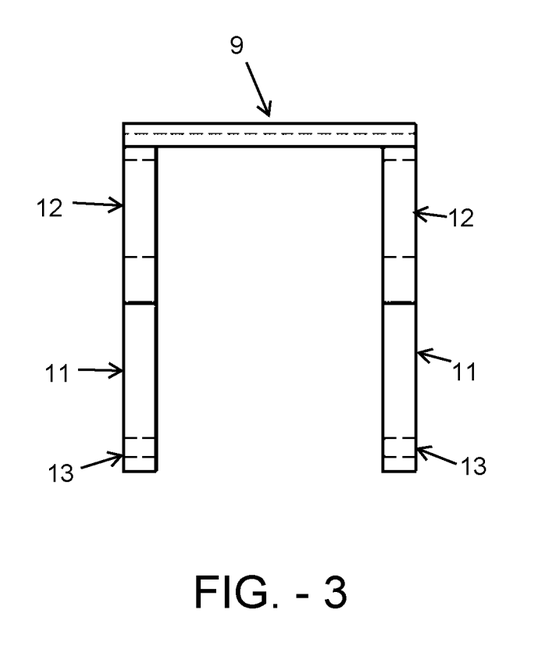
FIG. 3 is a front planar view of the conveyor safety guard module of FIG. 2.
Figure 4:
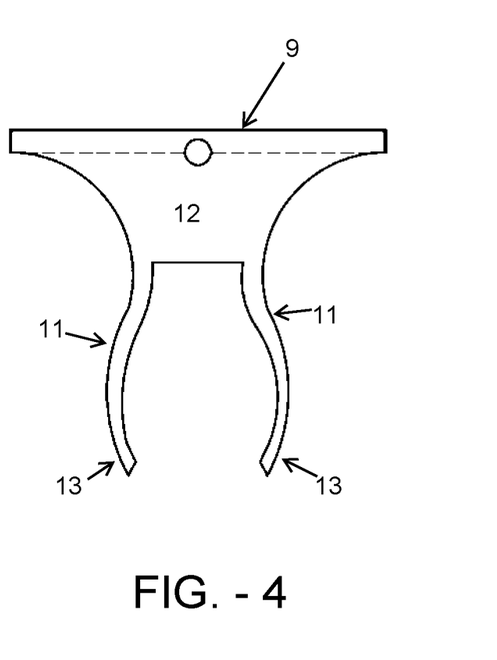
FIG. 4 is a side planar view of the conveyor safety guard module of FIG. 2.

FIG. 2 is a perspective view of a conveyor safety guard module according to one embodiment of the present invention. FIG. 3 is a front planar view of the conveyor safety guard module of FIG. 2. FIG. 4 is a side planar view of the conveyor safety guard module of FIG. 2.

The conveyor safety guard module 8 shown in FIGS. 2-4 includes a top cover portion 9 that is flat and lower resilient engaging structures 10 that extend downward along each side of the top cover portion 9. Each of the resilient engaging structures 10 includes a pair of resilient arcuate legs 11 that extend downwardly from lower sidewalls 12 that in turn extend downward from opposite sides of the top cover portion 9. The lower sidewalls 12 provide a mechanically strong base from which the resilient arcuate legs 11 extend. As shown the outer sides of the lower sidewalls 12 together with the resilient arcuate legs 11 form a continuous arcuate shape having a radius that is complementarily shaped to the outer diameter of rollers between which the conveyor safety guard module 8 is to be positioned. The tips or end portions 13 of the resilient arcuate legs 11 have a reverse curved or slanted shape that will engage facing surfaces of adjacent rollers causing the ends of the resilient arcuate legs 11 to deflect towards one another and allow the conveyor safety guard module 8 to be pushed downward and be seated in position between adjacent rollers with the arcuate shape of the resilient arcuate legs 11 resting against the adjacent roller surfaces and with the top cover portion 9 extending relatively flat over tops of the adjacent rollers and covering the underlying drive bands or belts. Here it is noted that the degree of resiliency of the resilient arcuate legs 11 is a function of the thickness of the resilient arcuate legs 11 and the material from which the conveyor safety guard modules are formed or molded and can be determined and adjusted as desired by those skilled in the art.

Figure 5:
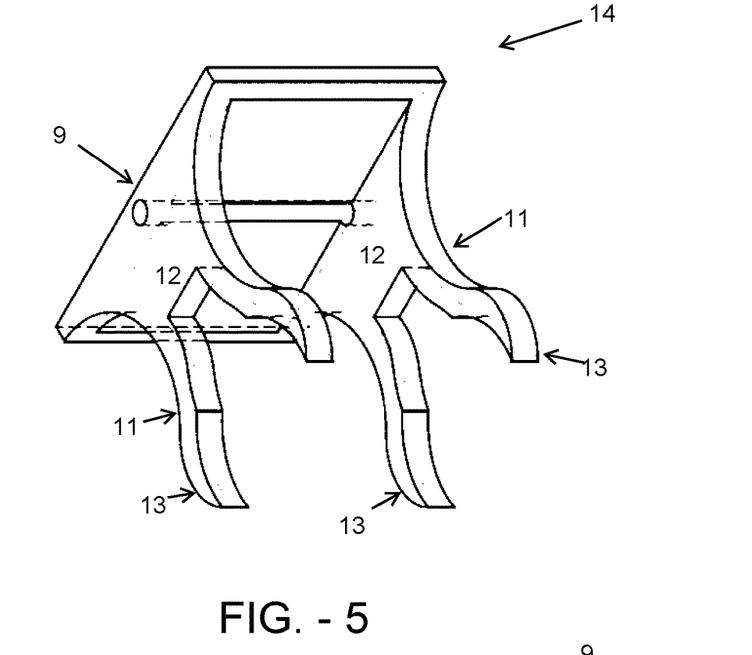
FIG. 5 is a perspective view of a conveyor safety guard module according to another embodiment of the present invention.
Figure 6:
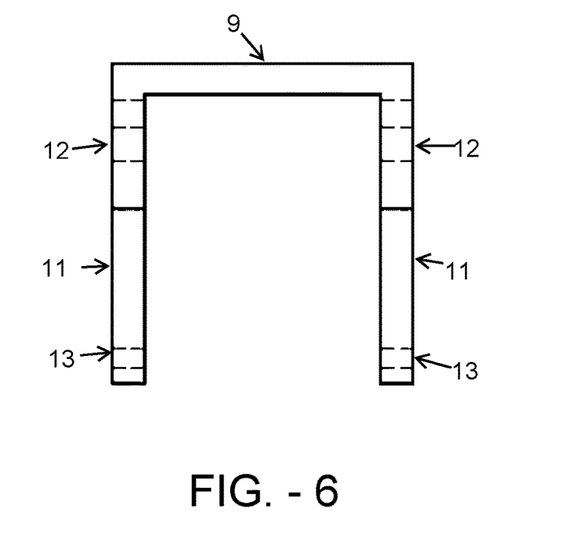
FIG. 6 is a front planar view of the conveyor safety guard module of FIG. 5.
Figure 7:
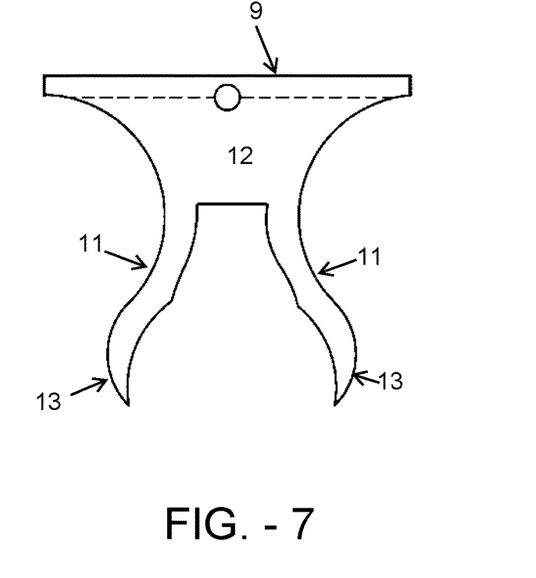
FIG. 7 is a side planar view of the conveyor safety guard module of FIG. 5.

FIG. 5 is a perspective view of a conveyor safety guard module according to another embodiment of the present invention. FIG. 6 is a front planar view of the conveyor safety guard module of FIG. 5. FIG. 7 is a side planar view of the conveyor safety guard module of FIG. 5.

The shape of the embodiment of the conveyor safety guard module 14 shown in FIGS. 5-7 is similar to the shape of the conveyor safety guard modular 8 shown in FIGS. 2-4 except the arcuate shape formed by the outer sides of the lower sidewalls 12 together with the resilient arcuate legs 11 has a longer arc length than corresponding arcuate shape formed by the outer sides of the lower sidewalls 12 together with the resilient arcuate legs 11 in FIGS. 2-4. This longer arc shape will allow the resilient arcuate legs 11 to encompass a greater portion of the outer diameter of adjacent rollers. As shown the length of the end portions 13 of the resilient arcuate legs 11 that have a reverse curved shape is shorter than in the case of the conveyor safety guard module of FIGS. 2-4.

Due to the slight differences in shape between the conveyor safety guard module of FIGS. 2-4 and 5-7, the conveyor safety guard module 14 of FIGS. 5-7 will require more pressure to be push downward between two adjacent rollers and will require more force and perhaps a tool to pry and remove the conveyor safety guard module 14.

Figure 8:
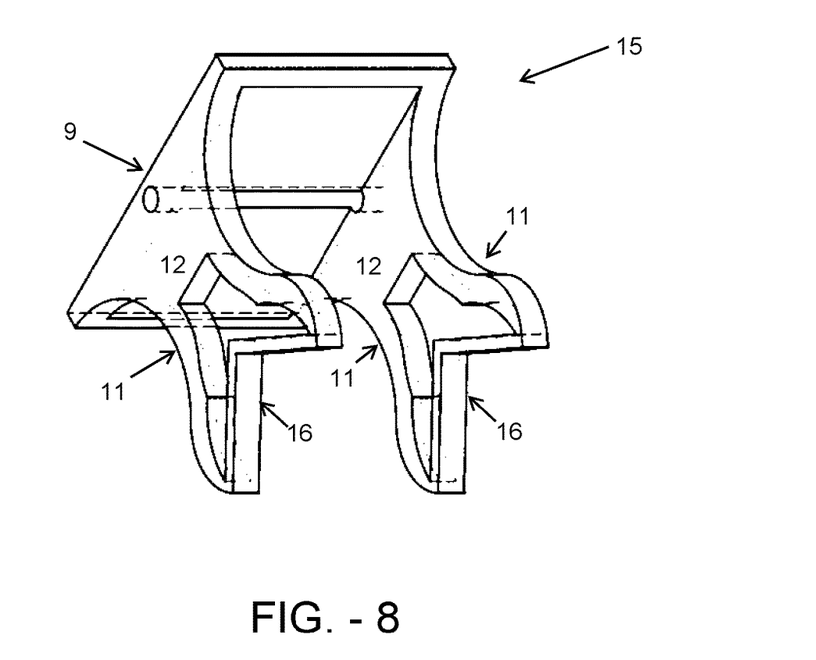
FIG. 8 is a perspective view of a conveyor safety guard module according to another embodiment of the present invention.
Figure 9:
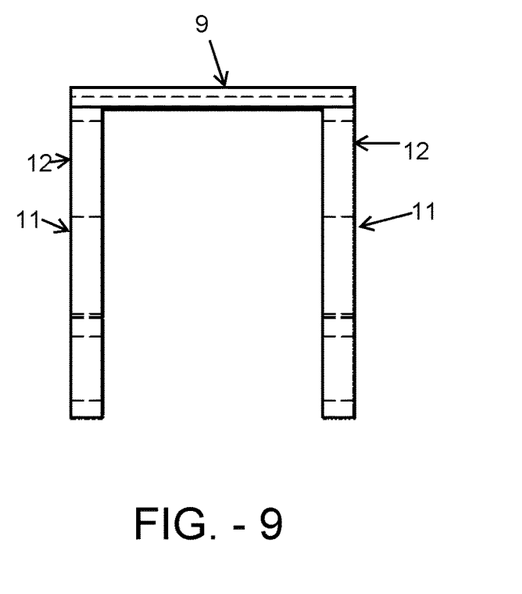
FIG. 9 is a front planar view of the conveyor safety guard module of FIG. 8.
Figure 10:
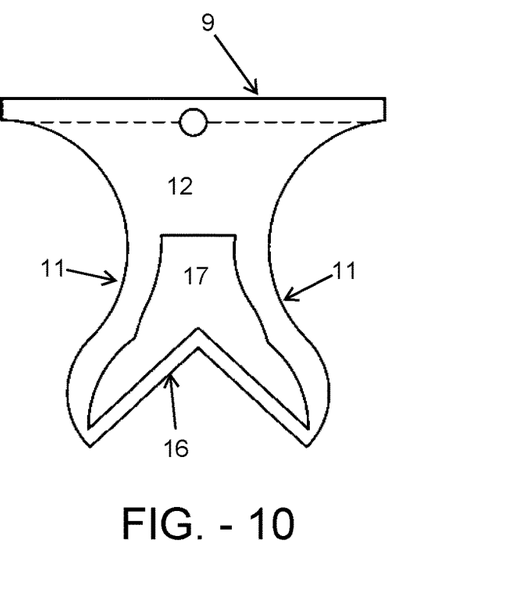
FIG. 10 is a side planar view of the conveyor safety guard module of FIG. 8.

FIG. 8 is a perspective view of a conveyor safety guard module according to another embodiment of the present invention. FIG. 9 is a front planar view of the conveyor safety guard module of FIG. 8. FIG. 10 is a side planar view of the conveyor safety guard module of FIG. 8.

The conveyor safety guard module 15 shown in FIGS. 8-10 is somewhat similar to the conveyor safety guard module 14 shown in FIGS. 5-7 except it includes a bridge element 16 that extends between the ends of the resilient arcuate legs 11. The bridge element 16 has an inverted V-shaped configuration as shown. When the conveyor safety guard module 15 of FIGS. 8-10 is pushed downward between two adjacent rollers and the ends of the resilient legs 11 are deflected towards one another, the bridge element 16 can flex about the apex 17 of the inverted V-shaped bridge element 16. In this manner the inverted V-shaped bridge element 16 can increase the resiliency of the resilient arcuate legs 11 to deflect together and apart.

Figure 11:
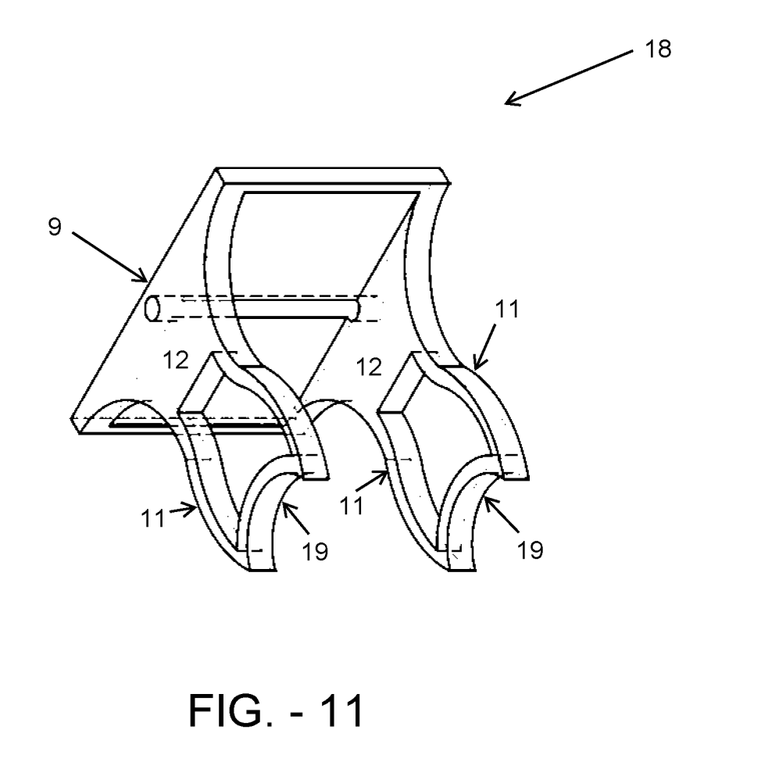
FIG. 11 is a perspective view of a conveyor safety guard module according to another embodiment of the present invention.
Figure 12:
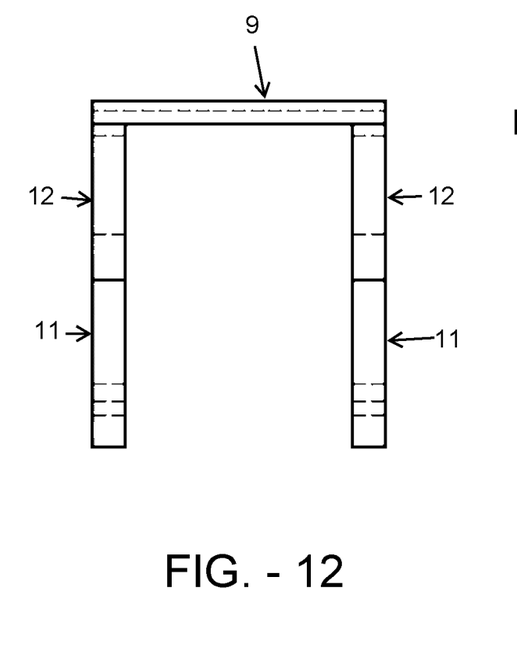
FIG. 12 is a front planar view of the conveyor safety guard module of FIG. 11.
Figure 13:
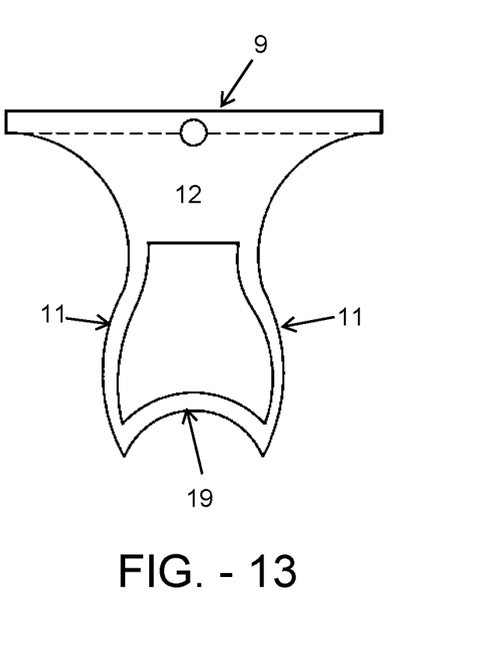
FIG. 13 is a side planar view of the conveyor safety guard module of FIG. 11.

FIG. 11 is a perspective view of a conveyor safety guard module according to another embodiment of the present invention. FIG. 12 is a front planar view of the conveyor safety guard module of FIG. 11. FIG. 13 is a side planar view of the conveyor safety guard module of FIG. 11.

The conveyor safety guard module 18 shown in FIGS. 11-13 is somewhat similar to the conveyor safety guard module 15 shown in FIGS. 8-10 except the bridge element 19 that extends between the ends of the resilient arcuate legs 11 has a peaked curved shape rather than having an inverted V-shape. Otherwise the bridge element 19 of FIGS. 11-13 functions in the same manner as the bridge element 16 in the embodiment of the conveyor safety guard module 15 shown in FIGS. 8-10.

Figure 14:
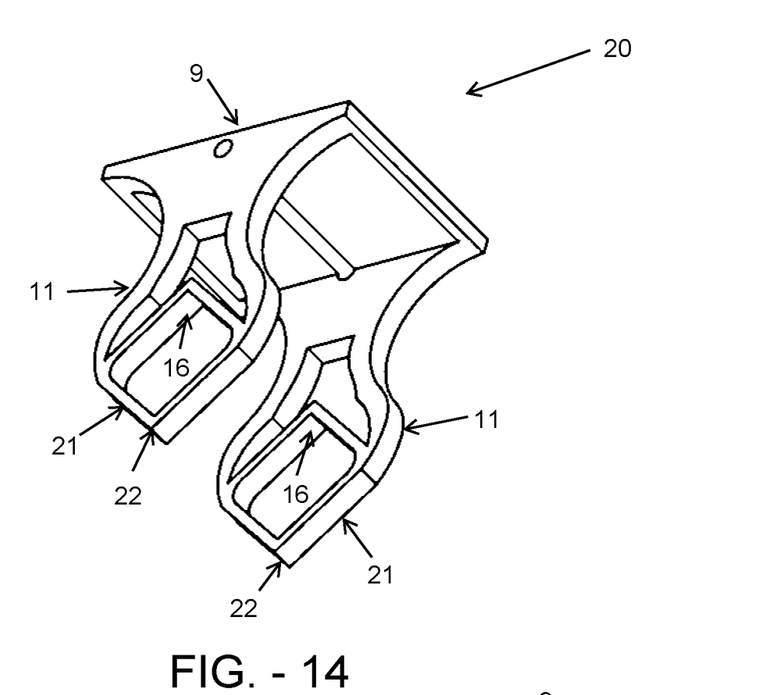
FIG. 14 is a perspective view of a conveyor safety guard module according to another embodiment of the present invention.
Figure 15:
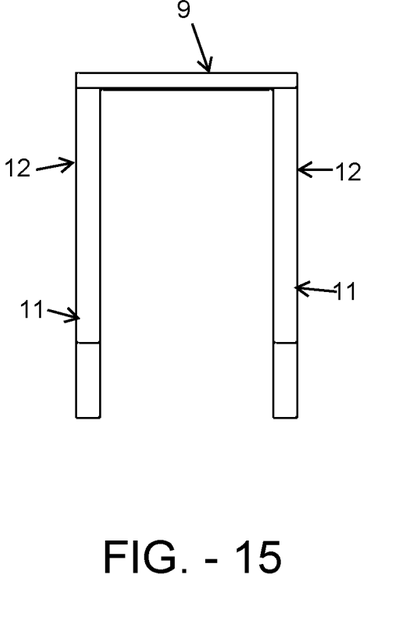
FIG. 15 is a front planar view of the conveyor safety guard module of FIG. 14.
Figure 16:
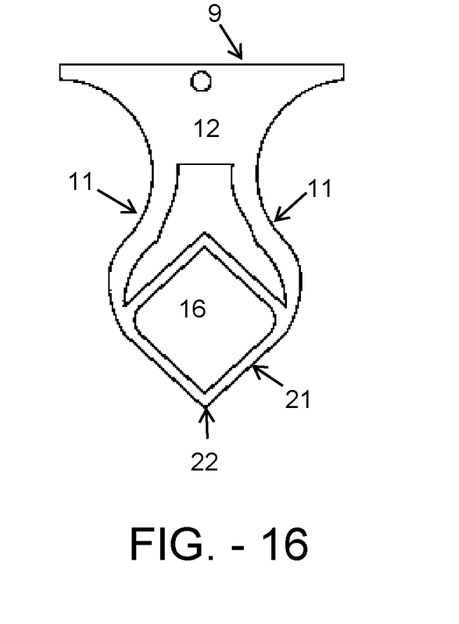
FIG. 16 is a side planar view of the conveyor safety guard module of FIG. 14

FIG. 14 is a perspective view of a conveyor safety guard module according to another embodiment of the present invention. FIG. 15 is a front planar view of the conveyor safety guard module of FIG. 14. FIG. 16 is a side planar view of the conveyor safety guard module of FIG. 14.

The conveyor safety guard module 20 of FIGS. 14-16 is somewhat similar to the conveyor safety guard module 15 shown in FIGS. 8-10 except, in addition to the inverted V-shaped bridge element 16 the conveyor safety guard module 20 in FIGS. 14-16 includes an lower, downward protruding bridge element 21 that has a downward pointed apex 22 that can be used to align the conveyor safety guard module 20 between two adjunct rollers when installing the conveyor safety guard module 20 in a motor driven conveyor system. As in the case of the bridge element 20 described above in reference to FIGS. 8-10, the lower bridge element 22 in FIGS. 14-16 can increase the resiliency of the resilient arcuate legs 11 to deflect together and apart.

Figure 17:
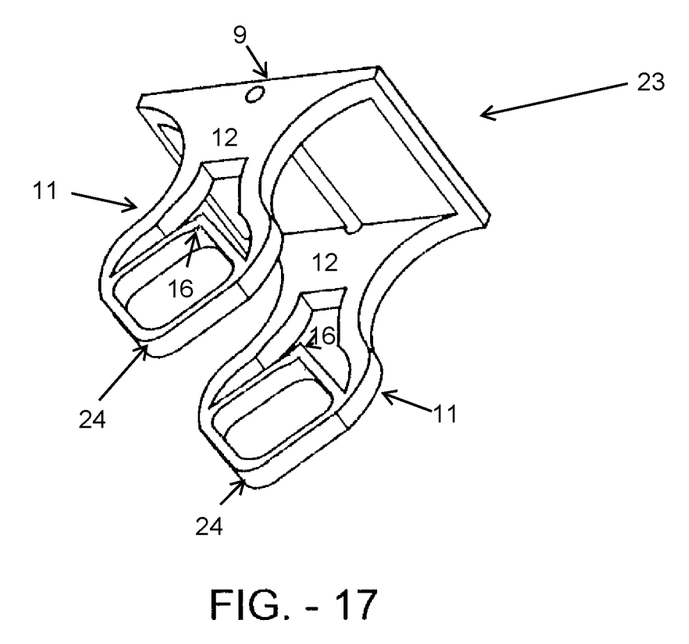
FIG. 17 is a perspective view of a conveyor safety guard module according to another embodiment of the present invention.
Figure 18:
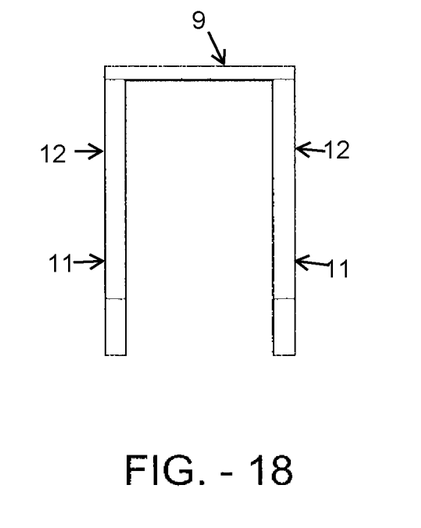
FIG. 18 is a front planar view of the conveyor safety guard module of FIG. 17.
Figure 19:
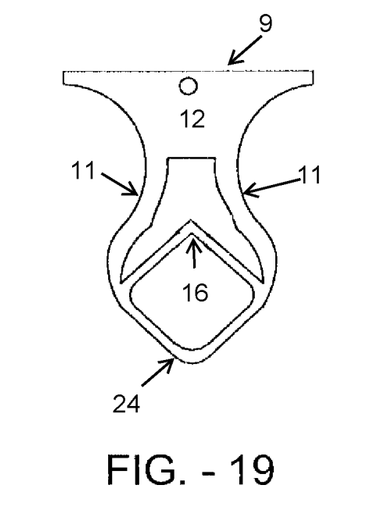
FIG. 19 is a side planar view of the conveyor safety guard module of FIG. 17.

FIG. 17 is a perspective view of a conveyor safety guard module according to another embodiment of the present invention. FIG. 18 is a front planar view of the conveyor safety guard module of FIG. 17. FIG. 19 is a side planar view of the conveyor safety guard module of FIG. 17.

The conveyor safety guard module 23 of FIGS. 17-19 is somewhat similar to the conveyor safety guard module 20 shown in FIGS. 14-16 except the lower, downward protruding bridge element 24 has a blunt or curved apex that projects downward rather than a pointed downward projecting bridge element 22 as shown in FIGS. 14-16.

Figure 20:
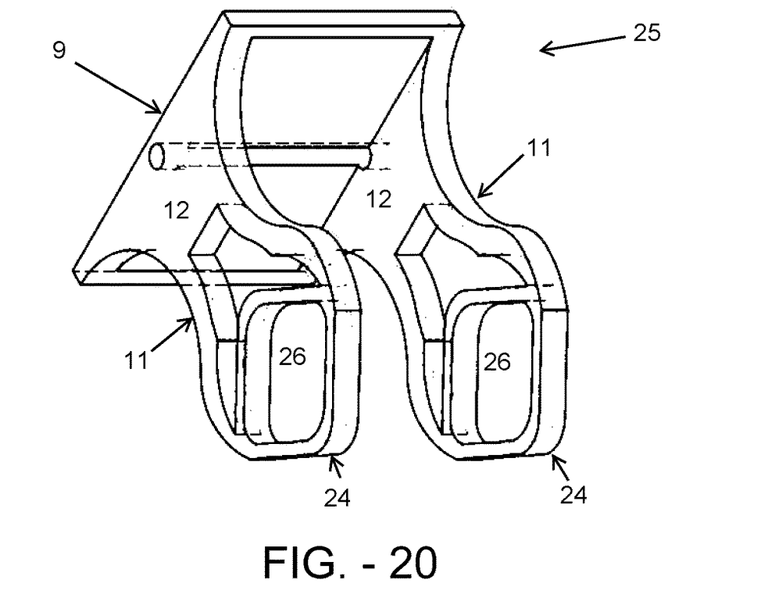
FIG. 20 is a perspective view of a conveyor safety guard module according to another embodiment of the present invention.
Figure 21:
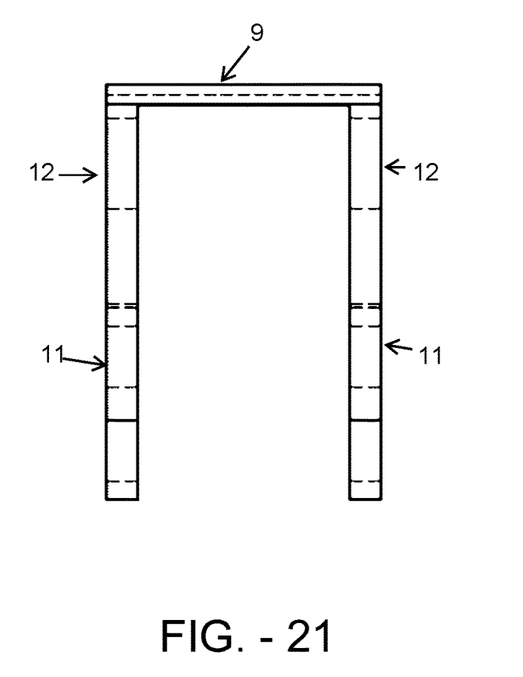
FIG. 21 is a front planar view of the conveyor safety guard module of FIG. 20.
Figure 22:
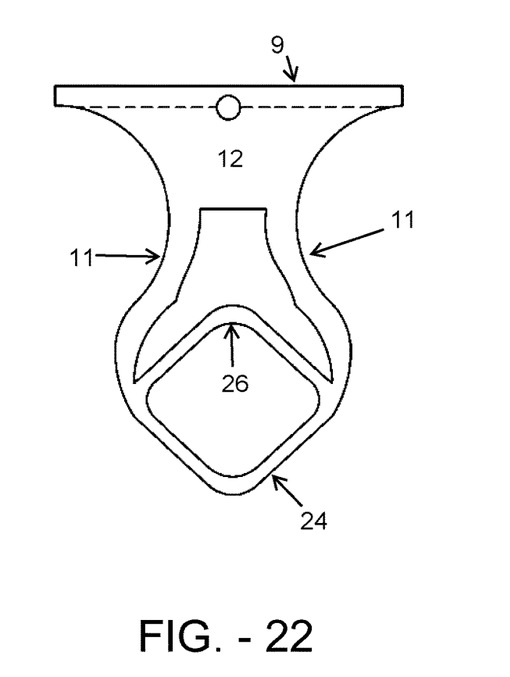
FIG. 22 is a side planar view of the conveyor safety guard module of FIG. 20.

FIG. 20 is a perspective view of a conveyor safety guard module according to another embodiment of the present invention. FIG. 21 is a front planar view of the conveyor safety guard module of FIG. 20. FIG. 22 is a side planar view of the conveyor safety guard module of FIG. 20.

The conveyor safety guard module 25 of FIGS. 20-22 is somewhat similar to the conveyor safety guard module 23 shown in FIGS. 17-19 except the bridge element 26 shown in FIGS. 20-22 that is included together with the downward protruding bridge element 24 shown in FIGS. 17-19 has a blunt or curved apex that projects upward as shown.

Figure 23:
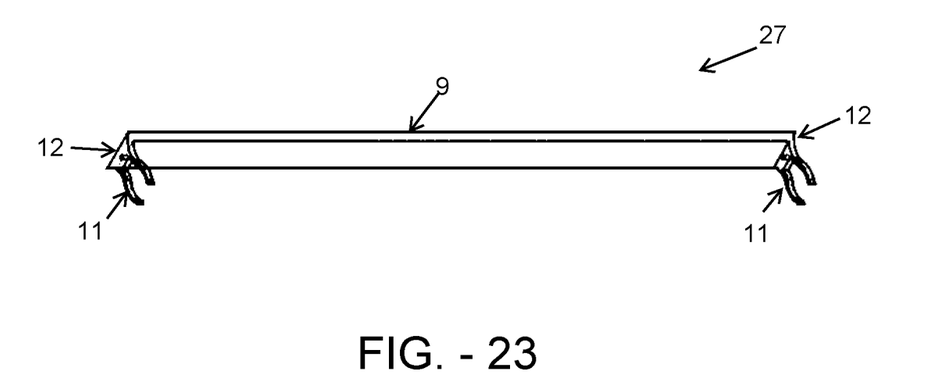
FIG. 23 is a perspective view of a conveyor safety guard module according to another embodiment of the present invention.

FIG. 23 is a perspective view of a conveyor safety guard module according to another embodiment of the present invention.

The conveyor safety guard module 27 of FIG. 23 has a width that can vary and, if desired, can extend across the entire width of a motor driven conveyor system. The top cover portion 9 includes downward extending side walls 12 and arcuate resilient legs 11. As can be appreciated any of the embodiments of the conveyor safety guard modules of FIGS. 2-22 can be configured to have the with of the conveyor safety guard module of FIG. 23.

Figure 24:
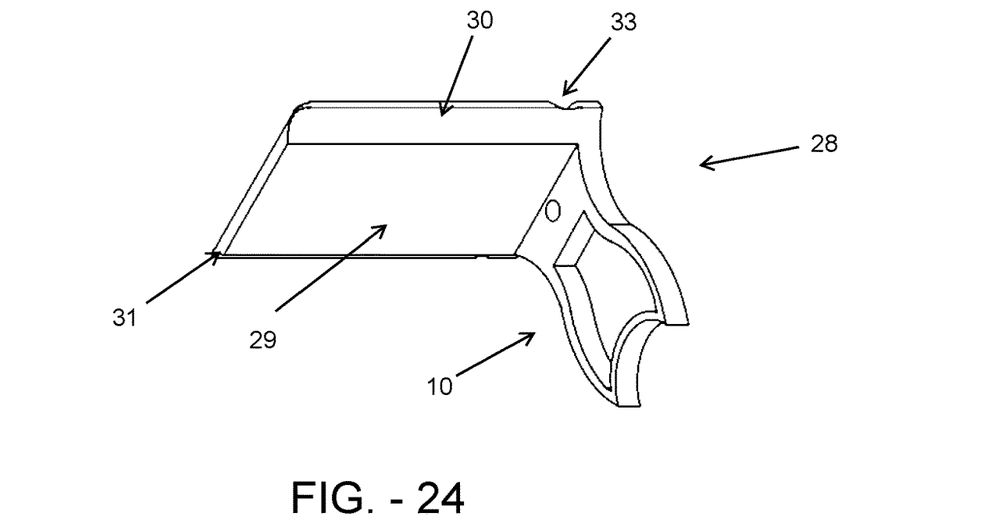
FIG. 24 is a perspective view of a conveyor safety guard module according to another embodiment of the present invention.
Figure 25:
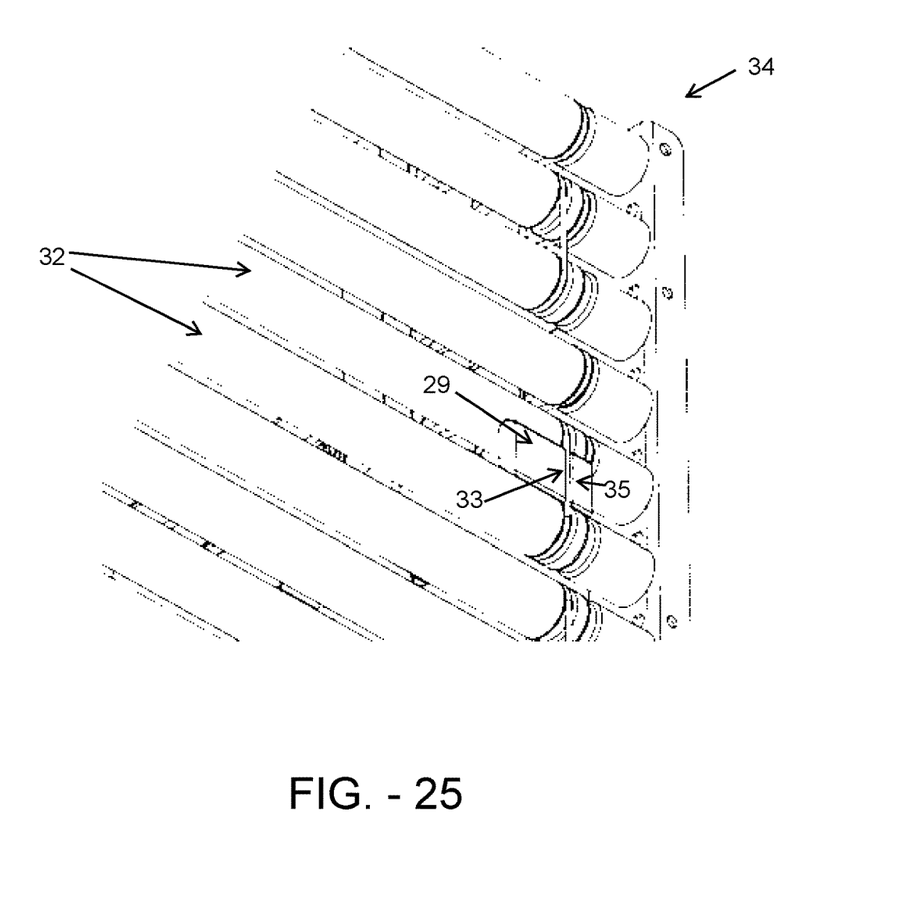
FIG. 25 is a perspective view of the conveyor safety guard module of FIG. 24 installed between adjacent rollers of a motor driven roller conveyor.

FIG. 24 is a perspective view of a conveyor safety guard module according to another embodiment of the present invention. FIG. 25 is a perspective view of the conveyor safety guard module of FIG. 24 installed between adjacent rollers of a motor driven roller conveyor.

The conveyor safety guard module 28 of FIG. 24 has a top cover portion 29 that has front and rear surfaces 30, 31 that are curved inwardly so as to be positioned between two adjacent rollers 32 as shown in FIG. 25. The conveyor safety guard module 28 includes a single lower extending resilient engaging structure 10 that extends downward from the outer side of the top cover portion 29. The lower extending resilient engaging structure 10 shown in FIG. 24 is similar to that shown in FIG. 11-13. Here it is noted that in other embodiments, the conveyor safety guard module 28 of FIGS. 24-25 can have the lower extending resilient engaging structure of any of the embodiments of the conveyor safety guard module of FIGS. 2-22.

The conveyor safety guard module 28 of FIGS. 24-25 includes a channel 33 in the top cover portion 29 that extends between the front and rear surfaces 30, 31 and is configured to receive a drive band or belt of a motor driven pulley conveyor system. As shown in FIG. 25 when the conveyor safety guard module 28 of FIG. 24 is installed between adjacent rollers 32 in a motor driven roller conveyor 34, the drive band or belt 35 connected between the adjacent rollers 32 passes through channel 33 provided in the top cover portion 29. In this configuration the conveyor safety guard module 28 provides protection from articles of clothing or other loose articles of a worker from getting caught in drive bands or belts 35. In addition, the conveyor safety guard module 28 of FIG. 24 covers the space between the adjacent rollers 32 without extending above the tops of the adjacent rollers 32 or at any appreciable height that would preclude articles conveyed on the conveyor 34 from passing over the conveyor safety guard module 28. This later function will allow the conveyor to convey smaller articles that might otherwise fall or get stuck between adjacent rollers.

While the conveyor safety guard module 28 shown in FIGS. 24-25 extends only a short distance in the width direction of the conveyor, it is to be understood that in further embodiments the conveyor safety guard module 28 of FIGS. 24-25 could extend across any portion of the width of the conveyor, including across the full width of the conveyor and could include lower extending resilient engaging structures at both opposite sides and/or intermediately located lower extending resilient engaging structures between the opposite sides as desired.

While the conveyor safety guard modules described above in reference to FIGS. 2-22 are configured to be inserted between and cover the ends of two adjacent rollers in a motor driven roller conveyor system, it is to be understood that in further embodiments of the present invention conveyor safety guard modules can be configured so that each covers more than two adjacent rollers. In such embodiments the length of the top cover portion can be extended to cover more than two adjacent rollers and the two or more pairs of the lower extending resilient engaging structures can be provided at the ends of such an extended top cover portion or at any intermediate position that would line up to be received between rollers of the conveyor system. The two or more pairs of lower extending resilient engaging structures could have the same configuration as any of the embodiments found and discussed in FIGS. 2-22 or a combination of two or more of the configurations in the embodiments found in discussed in FIGS. 2-22.

In further, as discussed above, embodiments the conveyor safety guard modules could have any width up to the entire width of a motor driven roller conveyor system or the width of the rollers of a motor driven roller conveyor system.

The width of the conveyor safety guard modules of the present invention including the width of the top cover portions can be minimized to just cover drive bands or belts of motor driven roller conveyor systems so as not to unduly limit the width of the conveyor that is used to convey items along the conveyor. The top cover portions can have a rectangular or square shape and can be sized so that adjacently installed ones of the conveyor safety guard modules abut one another and otherwise provide a continuous covering extending over of the drive bands or belts of a motor driven roller conveyor system. In one example the top portion of each conveyor safety guard module can extend to cover half of the top or each adjacent roller between which the conveyor safety guard modules are positioned.

In further embodiments of the conveyor safety guard modules the resilient arcuate legs and the opposed side walls of the top cover portion could be continuous structures that extend continuously across the width of the conveyor safety guard modules.

The top cover portion of the conveyor safety guard modules can be provided with though holes that extend between the opposite sides for purposes of attaching the conveyor safety guard modules to the side of a conveyor system using mechanical fasteners. Alternatively magnets can be provided in at least one of the opposite sides of the top cover portion or in at least one of the sidewalls to secure the conveyor safety guard modules along the side of a conveyor system.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. In a conveyor system having a plurality of rollers including at least one motor driven roller and free rollers and drive bands or belts coupled between the plurality of rollers to transfer rotational movement between the rollers, the improvement comprising at least one conveyor safety guard module configured to be inserted between adjacent pairs of the rollers, wherein each of the at least one conveyor safety guard module comprises:
- a top cover portion; and
- resilient engaging structures that extend downward from the top cover portion,
  - wherein each resilient engaging structure includes a pair of resilient arcuate legs that are configured to be received between two adjacent rollers of the motor driven roller conveyor, resiliently engage between lower portions of sides of the two adjacent rollers to secure the conveyor safety guard modules in place and position the top cover portion over the drive bands or belts.

2. A conveyor system according to claim 1, wherein the top cover portion of each of the at least one conveyor safety guard module includes opposed sidewalls that extend downward and the resilient pair of arcuate legs extend downward from the opposed side walls.

3. A conveyor system according to claim 2, wherein the opposed side walls and the resilient arcuate legs of each of the at least one conveyor safety guard module have an outer curved shape that corresponds to the outer diameter of adjacent rollers of the motor driven conveyor system.

4. A conveyor system according to claim 2, wherein end portions of the resilient arcuate legs of each of the at least one conveyor safety guard module have a reverse curved or slanted shape.

5. A conveyor system according to claim 2, wherein resilient engaging structures of each of the at least one conveyor safety guard module further includes an upward directed bridge element that extends between ends of the resilient arcuate legs.

6. A conveyor system according to claim 5, wherein the upward directed bridge elements of each of the at least one conveyor safety guard module has a V-shape.

7. A conveyor system according to claim 6, wherein the resilient engaging structures of each of the at least one conveyor safety guard module further includes a downward directed bridge element.

8. A conveyor system according to claim 7, wherein the downward directed bridge elements of each of the at least one conveyor safety guard module have a pointed free end.

9. A conveyor system according to claim 7, wherein the downward directed bridge elements of each of the at least one conveyor safety guard module have a curved free end.

10. A conveyor system according to claim 5, wherein the upward directed bridge elements of each of the at least one conveyor safety guard module has a curved shape.

11. A conveyor system according to claim 10, wherein the resilient engaging structures of each of the at least one conveyor safety guard module further includes a downward directed bridge element.

12. A conveyor system according to claim 11, wherein the downward directed bridge elements of each of the at least one conveyor safety guard module have a pointed free end.

13. A conveyor system according to claim 11, wherein the downward directed bridge elements of each of the at least one conveyor safety guard module have a curved free end.

14. In a conveyor system having a plurality of rollers including at least one motor driven roller and free rollers and drive bands or belts coupled between the plurality of rollers to transfer rotational movement between the rollers, the improvement comprising at least one conveyor safety guard module configured to be inserted between adjacent pairs of the rollers, wherein each of the at least one conveyor safety guard module comprises:
- a top cover portion having opposite sides and front and rear surfaces;
- a channel provided in the top surface of the cover portion that extends between the front and rear surfaces of the top cover portion; and
- at least one resilient engaging structure that extend downward from at least one of the opposite sides of the top cover portion,
  - wherein each resilient engaging structure includes a pair of resilient arcuate legs that are configured to be received between two adjacent rollers of the motor driven roller conveyor, resiliently engage between lower portions of sides of the two adjacent rollers to secure the conveyor safety guard modules in place and position the top cover portion under the drive bands or belts so that the drive bands or belts pass through the channel provided in the top surface of the cover portion.

15. A conveyor system according to claim 14, wherein when positioned between two adjacent rollers of the motor driven roller conveyor the top surface of the top cover portion is even with tops of the adjacent rollers.

16. A conveyor system according to claim 14, wherein the front and rear surfaces of the top cover portion are curved inward.

17. A conveyor system according to claim 14, wherein the top cover portion extends across a width of the motor driven conveyor system when positioned between two adjacent rollers.

18. A method of modifying a motor driven roller conveyor system to make the system safe for workers which method comprises: providing a conveyor system having a plurality of rollers including at least one motor driven roller and free rollers and drive bands or belts coupled between the plurality of rollers to transfer rotational movement between the rollers;
- providing at least one conveyor safety guard module configured to be inserted between adjacent pairs of the rollers and shield workers from drive bands or belts coupled to the adjacent rollers, the at least one conveyor safety guard module comprising a top cover portion and resilient engaging structures that extend downward from the top cover portion; and
- inserting said at least one conveyor safety guard module between an adjacent pair of the rollers so that the resilient engaging structures resiliently engage between lower portions of sides of two adjacent rollers to secure the conveyor safety guard modules in place and shield drive bands or belts coupled to the adjacent rollers with a top portion of the at least one conveyor safety guard module.

19. A method of modifying a motor driven roller conveyor system according to claim 18, wherein the drive bands or belts are covered by the top cover portion of the at least one conveyor safety guard module when the at least one conveyor safety guard module is inserted between adjacent pairs of rollers.

20. A method of modifying a motor driven roller conveyor system according to claim 18, wherein the drive bands or belts are received in a channel provided in the top cover portion of the at least one conveyor safety guard module when the at least one conveyor safety guard module is inserted between adjacent pairs of rollers.

* * * * *